No. 651,956. Patented June 19, 1900.
R. E. STRAIT.
APPARATUS FOR SECURING PISTON PACKING RINGS.
(Application filed Aug. 4, 1899.)
(No Model.)

Witnesses,

Inventor,
Ransom E. Strait
By Dewey Strong & Co.
att'ys

United States Patent Office.

RANSOM E. STRAIT, OF SACRAMENTO, CALIFORNIA.

APPARATUS FOR SECURING PISTON-PACKING RINGS.

SPECIFICATION forming part of Letters Patent No. 651,956, dated June 19, 1900.

Application filed August 4, 1899. Serial No. 726,085. (No model.)

*To all whom it may concern:*

Be it known that I, RANSOM E. STRAIT, a citizen of the United States, residing at Sacramento, county of Sacramento, State of California, have invented an Improvement in Apparatus for Securing Piston-Packing Rings; and I hereby declare the following to be a full, clear, and exact description of the same.

My invention relates to an apparatus for securing packing-rings in position, and which is particularly applicable to the triple-valve mechanism of an automatic air-brake.

The invention consists in a means for forming a tight joint in repairing the packing of the piston by which the valve controlling the various air-passages is operated, as I will hereinafter describe and claim.

Figure 1:
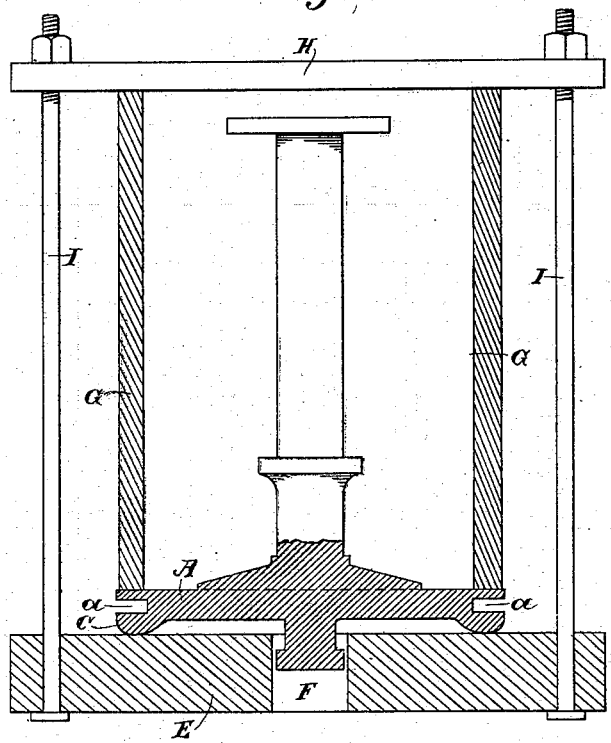
Figure 2:
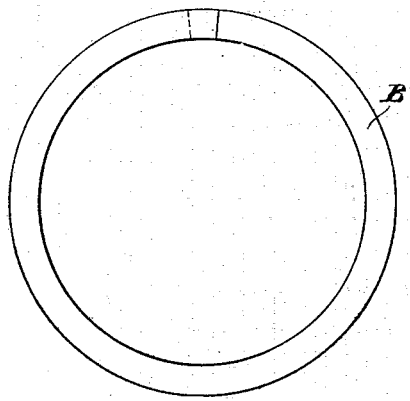
Figure 3:
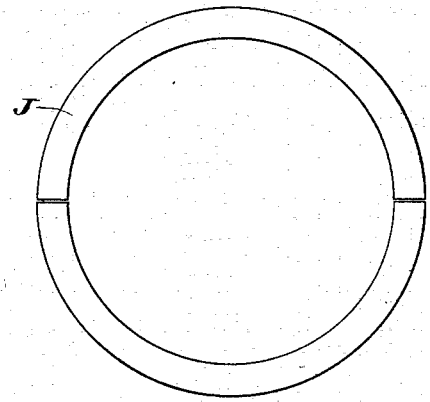

Referring to the accompanying drawings, Figure 1 is a view of this piston, to which I refer to explain my invention. Fig. 2 is a view of the packing-ring. Fig. 3 shows the split auxiliary ring.

The mechanism of the air-brake system is all made and all repair parts are furnished from the works, so that it is supposed to be only necessary to substitute a new part for one that is worn or damaged to bring the apparatus into perfect working condition again. By experience it is found that certain portions of the apparatus cannot be repaired in this manner, but that a certain supplemental operation must be carried on to provide a tight working joint in the piston by which the valves are actuated to open and close the various passages through which the auxiliary reservoir is charged and by which air is admitted to the brake-cylinder or released, as the case may be. This piston, which I have marked A, works in a cylinder and has a stem extending axially from one side, and this stem actuates the valves above mentioned. The periphery of the piston A is channeled, as shown at *a*, and adapted to receive the snap or packing ring B, which fits into this channel and is designed to make a tight joint within the interior of the cylinder, so that under certain conditions the piston moves toward one end of the cylinder and under other conditions it is moved toward the other end of the cylinder, and when the air is to be released it is important that this joint should be absolutely tight.

By experience it is shown that in the operation and the wear of parts the packing-joint becomes leaky and it is necessary to fit a new packing-ring into place. These rings, which are kept in stock, are inserted into the groove or channel *a* and should make the joint tight again; but this cannot be done, for the following reasons: During the operation either from the side pressure upon the packing-ring or from wear or other causes the channel becomes open, so that the new ring will not fit perfectly, but will leave a small space around the inner part of the ring through which sufficient air will leak to defeat the action of the brake, no matter how perfectly the peripheral joint may be made. It is the object of my invention to overcome this difficulty; and my invention consists in compressing the sides of the channel A until they fit close against the packing-ring B after it has been inserted into the channel. To carry out this operation, any suitable compressing device may be used which will produce a regular and even pressure upon the segmental face C of the piston. I have found that a very suitable plan is to provide a surface plate E, having a central opening F, into which the short projecting end of the piston-rod may extend, while the segmental edge C rests upon the surface of the plate. A cylinder G of sufficient diameter to rest upon the periphery of the piston upon the opposite side from the plate is fitted and has the ends faced to rest truly upon the edge of the piston, and the opposite end of the cylinder is subjected to the pressure of a plate H, actuated by screws I or otherwise, thus compressing the two parts of the piston-flange and causing it to fit snugly against the packing-ring. I do not, however, desire to confine myself to this particular means for closing this channel, since it is obvious that a great variety of substantially-equivalent devices may be used for the purpose, and the essence of my invention consists in making the tight joint by properly closing this channel substantially in the manner stated. This may be done either by compressing the sides of the groove or channel against the ring B after it has been inserted in place or a supplemental sectional ring J may be made of the proper thickness and inserted in the channel and the piston-rim compressed to fit it. The ring is then removed, and the snap or packing ring is afterward inserted.

Having thus described my invention, what I claim as new, and desire to secure by Letters Patent, is—

1. The combination of opposing means adapted to peripherally engage the opposite sides of a piston, and connected pressure means for causing the said opposing means to compress the flanged periphery of the piston upon an inserted packing.

2. The combination of means to peripherally engage one side of a piston, opposing means to peripherally engage the opposite side of said piston, and pressure devices connected with both of the aforesaid means for causing the latter to approach each other in line and compress the flanges of the piston upon an inserted packing.

3. The combination of a bed or surface upon which a channeled piston is adapted to be placed, a pressure device adapted to rest upon the edge of the upper surface of the piston, a plate engaging the pressure device and means connecting said plate with the bed whereby the parts are drawn together to cause the pressure device to compress the edges of the channel in the piston upon an interposed packing.

4. The combination with a channeled piston, of a surface plate or bed having a central opening for the projecting end of the piston said piston having a segmental edge resting upon said plate or bed; a cylinder resting upon the edge of the opposite portion of the piston, a plate resting upon the upper portion of the cylinder, and bolts or screws connecting the last-named plate with the surface plate or bed, for compressing the two parts of the piston-flange against an interposed packing.

In witness whereof I have hereunto set my hand.

RANSOM E. STRAIT.

Witnesses:
S. H. NOURSE,
GEO. H. STRONG.